March 6, 1956 E. H. B. BARTELINK 2,737,578

CONTROL TERMINAL FOR MOBILE RADIO TELEPHONE SYSTEMS

Original Filed April 14, 1947 4 Sheets-Sheet 1

INVENTOR.
Everhard H. B. Bartelink

BY McWalter Devine

Attorney

CONTROL TERMINAL FOR MOBILE RADIO TELEPHONE SYSTEMS

Original Filed April 14, 1947 4 Sheets-Sheet 2

INVENTOR.
Everhard H. B. Bartelink

By [signature]

Attorney

INVENTOR.
Everhard H. B. Bartelink
BY [signature]
Attorney

INVENTOR.
Everhard H. B. Bartelink
BY Wm. Walter Owen
Attorney

United States Patent Office 2,737,578

Patented Mar. 6, 1956

2,737,578

CONTROL TERMINAL FOR MOBILE RADIO TELEPHONE SYSTEMS

Everhard H. B. Bartelink, Bronxville, N. Y., assignor, by mesne assignments, to Automatic Electric Laboratories, Inc., Chicago, Ill., a corporation of Delaware Continuation of abandoned application Serial No. 741,289, April 14, 1947. This application April 25, 1951, Serial No. 222,877

11 Claims. (Cl. 250—6)

This application is a continuation of my copending application (now abandoned) Serial No. 741,289, filed on April 14, 1947, for new and useful improvements in Control Terminal for Mobile Telephone Systems.

This invention pertains to mobile radio telephone systems in which a multiplicity of mobile subscribers' telephone stations are linked by radio to "land-base," i. e., permanently located, radio transmitting and receiving stations, which latter are connected over land-based, wire lines to a control terminal, and thence to a central office or toll switchboard, whereby the mobile stations may communicate with land-based subscribers' stations, and also in accordance with the present invention, with each other.

The present invention pertains more particularly to the control terminal and associated switchboard portion of such a system, and provides equipment for such purposes, of a new design and characterized by various novel features of construction, circuit arrangement and operation, as set forth below.

The broad purpose of a mobile radio telephone system is to extend telephone service to subscribers' stations located on mobile units, such as trains, planes, automobiles, ships, etc., and thereby enable occupants therein to communicate by radio with the central office, and thence over land-based facilities with any land-based subscriber served by such facilities, or by radio with other mobile stations. To this end, the mobile stations are provided with radio transmitter and receiver units; and preferably also with station selectors responsive to dialing pulses, whereby the central office operator may dial any mobile station desired.

The control terminal of the invention is connected over a wire circuit with a land-based main radio transmitter, of sufficient power output to serve all mobile stations throughout a preselected service area. The radio transmitters of the mobile subscribers' stations are much lower in power output in order to be economical. Thus, their range is smaller than that of the main transmitter coverage. Accordingly, a number of land-based radio receivers are provided which are connected over wire lines to the control terminal, these land-base receivers being strategically located throughout the service area in such arrangement that at least one such receiver will always be within easy transmitting range of a mobile station, irrespective of its particular location in the service area.

The control terminal of the present invention embodies various novel features of construction and operation as follows:

It provides for a diagnosis by both the technical and switchboard operators of the land-based receivers connected thereto, which are exposed to interference or are defective at any particular time, together with means available to the technical operator at the control terminal and also additional means available to the switchboard operator, for rejecting any such receivers until the interference or defect is cleared.

Thus, there is provided for each land-based receiver circuit, at the technical and switchboard operators' positions, visual supervision indicators as to the operative status of the receiver circuit at all times, so that it can be determined at a glance whether the circuit is operating satisfactorily or not. These visual indicators preferably take the form of small neon tubes, driven by a speech amplifier coupled to the receiver circuit at the control terminal. If noise is being received over a receiver circuit at any particular time, the associated neon lamps will glow continuously, but will flicker in a familiar, characteristic manner if speech is being received in the absence of noise. Otherwise, the lamps will be extinguished. They are made small enough for mounting in lamp strips on the switchboard at the technical and switchboard operators' positions.

Mounted on the switchboards, adjacent these supervision indicators or neon lamps, are switches having associated therewith suitable relay circuits, whereby an operator may permanently or temporarily disconnect a noisy or defective receiver. Thus, "on-off" toggle switches are provided for permanently disconnecting a defective receiver until the defect is cleared. Also, "reject" and "reset" switches are provided, which operate in such fashion that if an operator actuates a reject switch, the associated land-based receiver will be disconnected for the duration of a call, unless meantime the operator actuates the reset switch. Otherwise, the circuit will be automatically restored at the conclusion of the call, when the connection is torn down, this to guard against possible oversight by an operator in restoring a temporarily noisy receiver.

In order to assure minimum delay in breaking down a circuit connection at the conclusion of a call, the control terminal of the present invention incorporates, as one of its outstanding features, an electronic speech-time relay, of novel circuit arrangement, which supervises a connection between subscribers' stations and automatically gives a disconnect signal when no speech is passed over the circuit for a preselected period of time, for example, five to twenty seconds, depending on the particular time delay setting of the device. This automatic disconnect signal given by the speech-time relay does not entitle the operator to disconnect the circuit without rechecking it, but warns her that she should check to determine whether the circuit is being held, or whether the conversation has ended.

In accordance with a further feature of the invention, the various land-based receiver output circuits are connected to a common "mixer" circuit at the control terminal, and thence to the switchboard position and also through a limiting amplifier to the main transmitter input, without the interposition of an hybrid coil, and in such manner that speech incoming from a mobile subscriber's station over any of the land-based receiver circuits is rebroadcast through the main transmitter to the other mobile subscribers' stations, in addition to being transmitted to a land-based subscriber; if the switchboard operator has established a connection to the latter. In this way, the mobile stations may communicate with each other, as well as with land-based stations.

The mixer circuit employed is, in and of itself, of novel construction, being featured by the use of grid-controlled electronic tubes, the grid circuits of which are individual to the land-based receiver circuits, but which work into a common cathode impedance, the manner of connection to the common cathode impedance being such, however, as to prevent coupling between the grid circuits of the tubes.

The signaling circuits of the control terminals and associated switchboard operate in such a way that carrier incoming from a mobile station actuates a white call lamp at the operator's position, which is extinguished when the operator answers by inserting her cord plug into the jack to which the land-based radio equipment is connected, and thereby switches on the outgoing carrier from the main land-based transmitter. However, if the main transmitter does not transmit outgoing carrier "on frequency," the operator will receive a flashy disconnect signal on a red lamp, mounted adjacent the white call lamp. On calls outgoing from the central office, insertion of the operator's cord plug switches on the outgoing carrier from the main transmitter as aforesaid. The operator thereupon actuates a dial-tone switch for modulating the carrier with dial tone, whereupon the operator may dial the station desired by means of her dialing equipment.

If the control terminal is designed in such a way that complete provision is made for the maximum number of land-based receivers that may ultimately have to be accommodated, the cost will be higher than is necessary in many instances. For this reason, the receiver terminations in the control terminal of the present invention are of unitary construction, and such that only as many receiver terminations are installed as are needed, and others may be added when necessary.

Other additional novel features of the present invention will become apparent from the subsequent detailed description of the invention.

Figures 3A, 9:
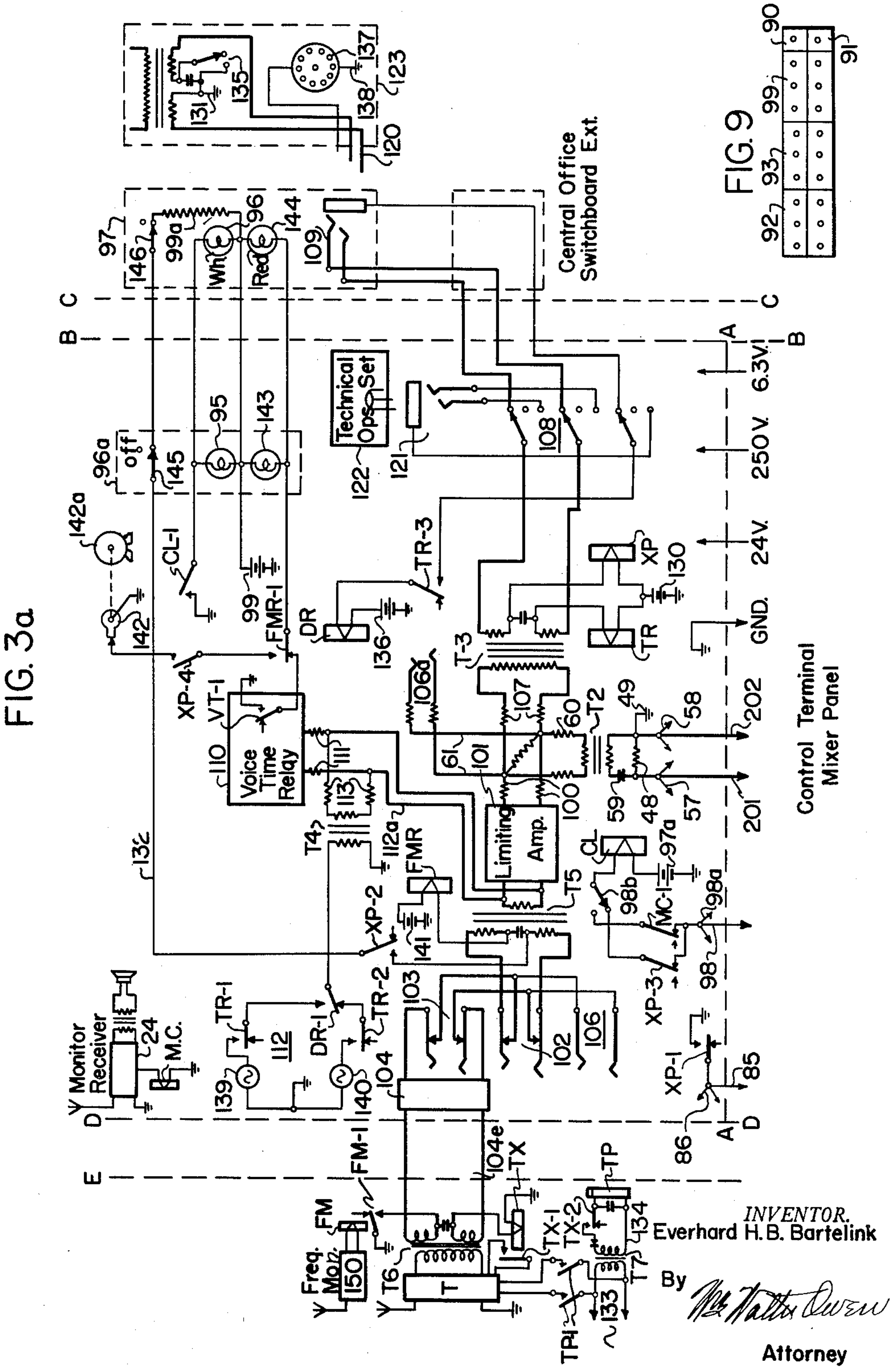
Figure 3B:
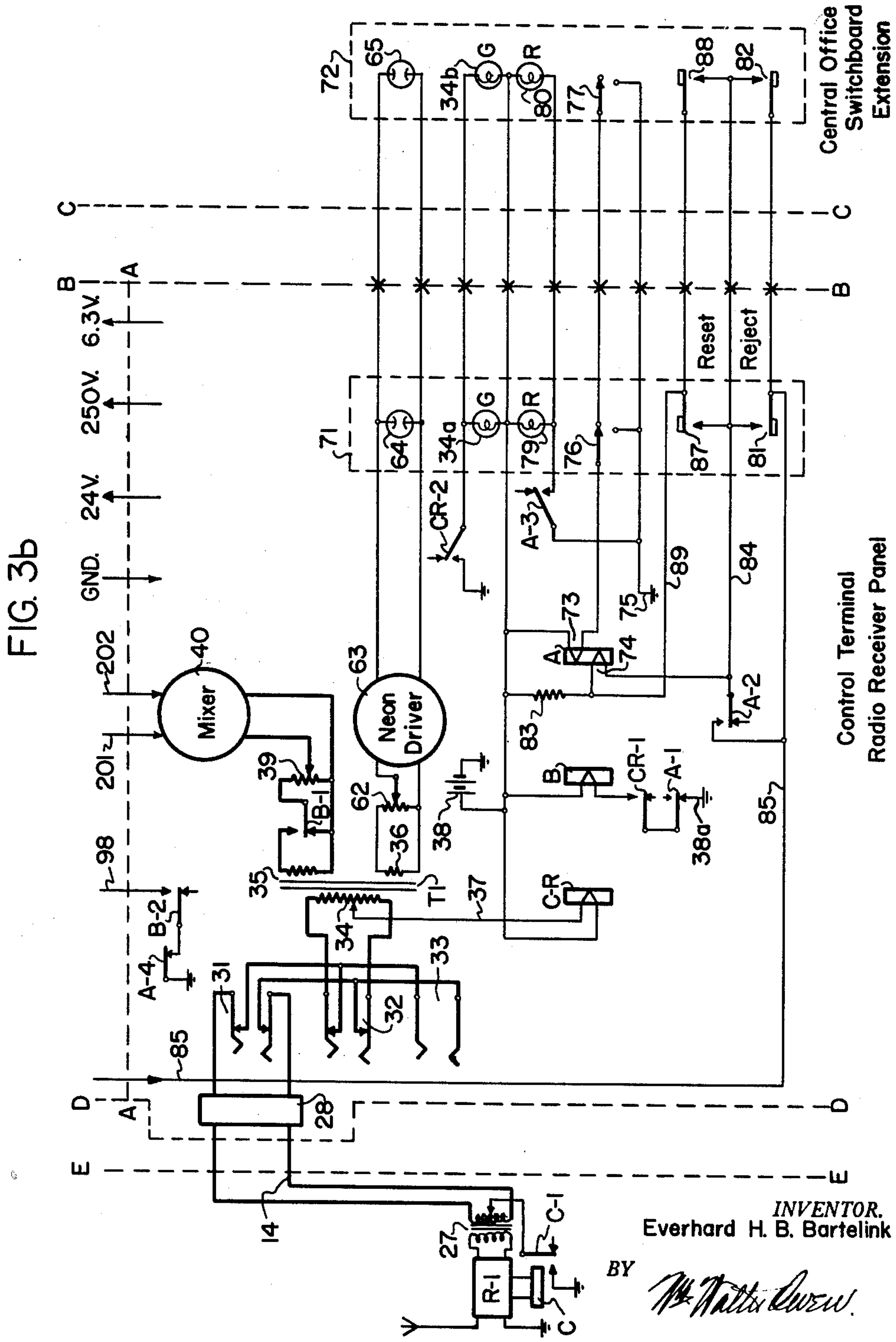

Figs. 3*a* and 3*b* illustrate, in the form of a circuit diagram, the control terminal of the present invention and associated operator's switchboard extension, as well as connections therefrom to the land-based radio transmitter and receiver units. Fig. 3*a* shows the mixer panel of the control terminal and Fig. 3*b* the associated receiver panel, the connections between the two being along the line A—A of Figs. 3*a* and 3*b*.

Figures 4, 5, 6, 7, 8:
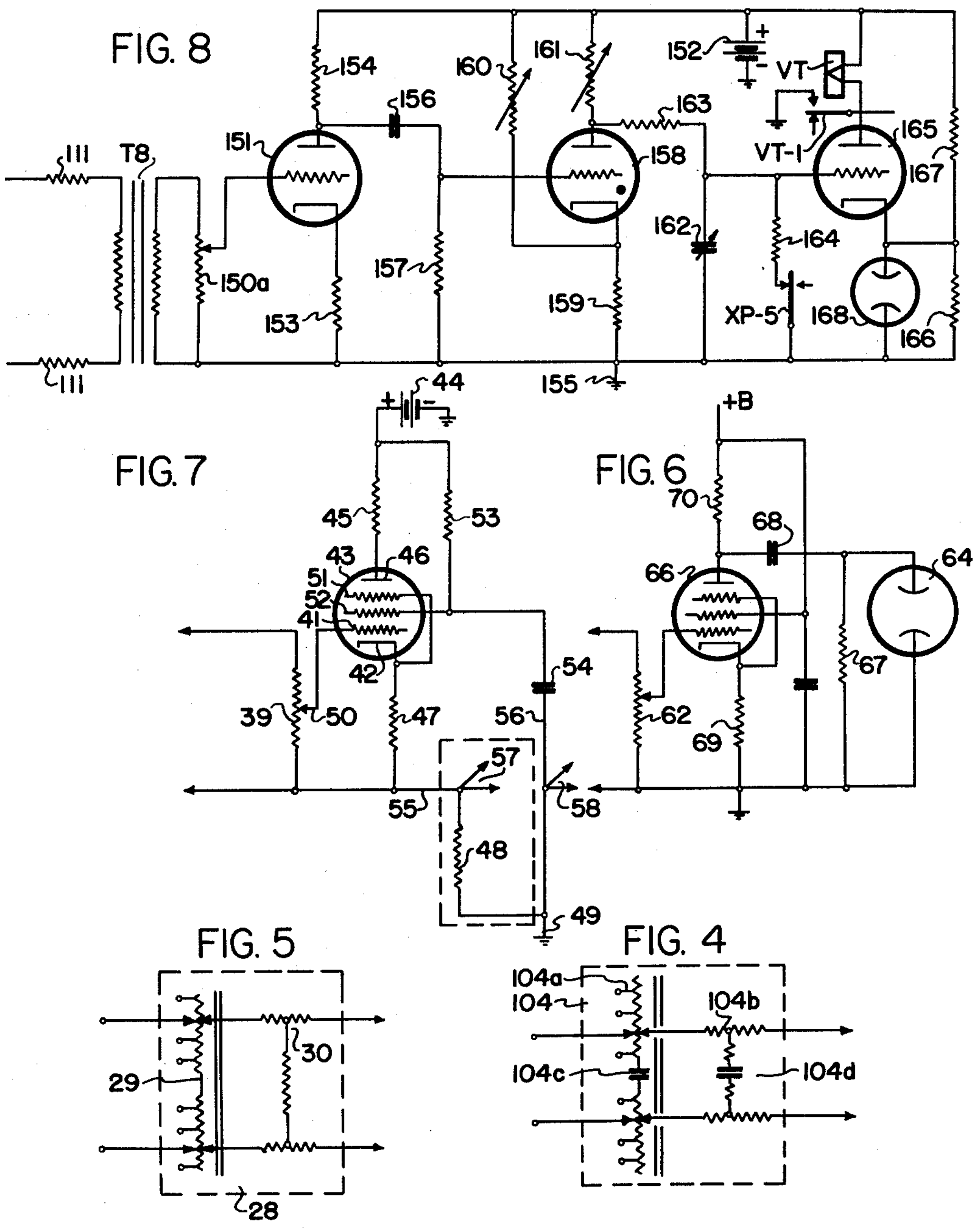

Figs. 4 and 5 are circuit diagrams of impedance-matching and signal-attenuating pads interposed in the land-based, main transmitter input circuit, and in the land-based, receiver output circuits respectively.

Fig. 6 is a circuit diagram of the neon driver and neon tube circuit employed for visual supervision of the land-based receivers.

Fig. 7 is a circuit diagram of the vacuum tube mixer circuit employed for combining signals incoming from the various land-based receivers.

Fig. 8 is a circuit diagram of the speech- or voice-time relay circuit above referred to.

Fig. 9 illustrates in elevation, the switchboard mounting of the on-off, reject and reset switches of the land-based receiver circuits, together with their associated neon and signal lamps for indicating the operative status of such circuits.

Figures 1, 2:
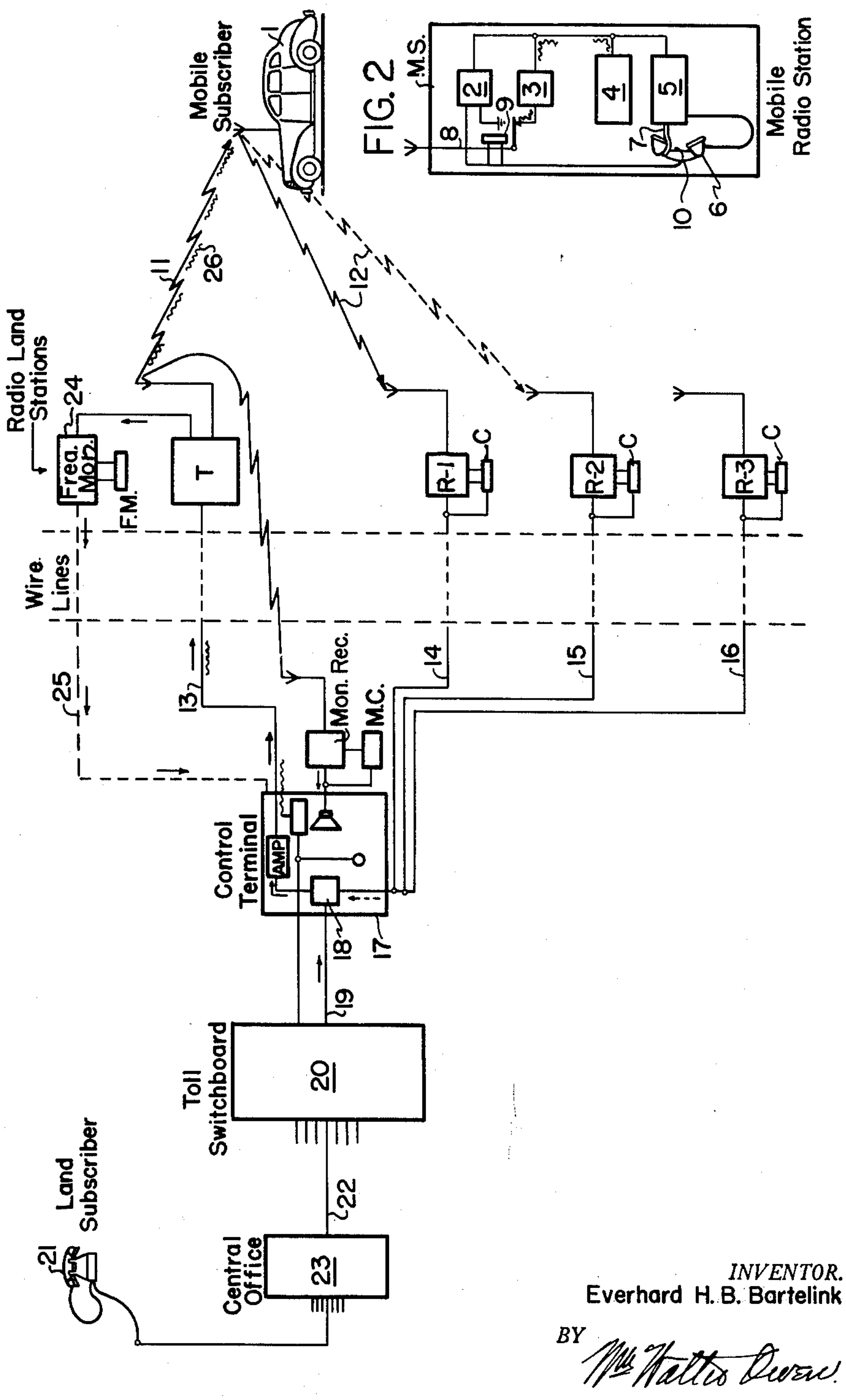
Fig. 1 is a diagrammatic layout of a mobile radio telephone system of the character to which the present invention is applicable, this figure illustrating the circuits employed for establishing a connection from a mobile subscriber's station to a land-based subscriber's station.
Fig. 2 is a diagrammatic layout of the essential elements of a mobile subscriber's telephone station.

Referring to Figs. 1 and 2, there is shown at the right a mobile subscriber's station MS, mounted in a mobile unit such as an automobile 1. The mobile station comprises a radio transmitter 2 and radio receiver 3 and a station selector 4, connected through a control panel 5 to a handset 6, normally resting on a switch hook 7. The radio transmitter and receiver units are connectible to an antenna 8 through contacts of a relay 9, actuated by a handset "push-to-talk" button 10, thereby to switch the antenna 8 from the receiver input to the transmitter output.

The mobile station is linked by radio, as indicated at 11, 12, to a land-based transmitter T, and land-based receivers, such as R–1, R–2, R–3, etc. The land based receiver, R–1, is shown in Fig. 3*b* as connected to the control terminal radio receiver panel. As stated, the land-based transmitter T is sufficiently powerful to serve all mobile stations within a preselected service area. On the other hand, the mobile station transmitters are of much lower power output in order to be economical. Accordingly, a multiplicity of land-based receivers are strategically located throughout the service area, so that at least one of them, such as R–1 in the drawing, will be within easy transmitting range of the mobile station 1, irrespective of its location in the service area.

The land-based transmitter T and receivers R–1, R–2, R–3, are connected over wire circuits, such as 13, 14, 15, 16, to a control terminal 17, where they are connected in the manner above referred to and as indicated at 18 over a wire circuit 19 to a toll switchboard 20, from whence a connection may be completed from the mobile station to a land-based subscriber's station, such as 21, over a toll line circuit 22 and through a central office 23, to which the land-based subscriber's station 21 is permanently connected.

Each land-based receiver R–1, R–2, R–3, etc., is provided with a carrier current actuated relay C, at least one of which, i. e., that nearest the mobile station 1, will be actuated upon receipt of incoming carrier 12 therefrom, thereby to actuate a call lamp at the technical operator's position at the control terminal 17 and also a the operator's position on the switchboard 20, as explained below. Some of the outgoing carrier from the land-based transmitter T is transmitted to the adjacent frequency monitor 24, which signals the control terminal over connection 25, and toll switchboard, as to whether or not the outgoing carrier from the transmitter T is operating "on frequency," as explained below.

On calls outgoing from the central office to a mobile subscriber's station, the outgoing carrier 11 from transmitter T is modulated with dialing signals, as indicated at 26, to actuate the station selector 4 at the desired mobile station, and thereupon to energize suitable signaling devices, lamps, buzzers, bells, etc., at the called station, as is fully disclosed in my copending application Serial No. 729,828, filed February 20, 1947.

Referring now to Figs. 3 to 8 inclusive, the receiver panel of the control terminal is shown in the portion of the Fig. 3*b* drawing below A—A, to the left of B—B, and to the right of D—D. The signals from a landbased radio receiver, such as R–1, picked up from a mobile station, are, after demodulation, fed through an audio-transformer 27 and thence over circuit 14 extending from the receiver station (at the left of E—E) to the control terminal, and thence through a matching pad 28, consisting of a matching transformer, as at 29, Fig. 5, which brings all receiver circuits to the same impedance, and an attenuator pad, as at 30, Fig. 5, which brings the speech output of all receiver circuits to a common volume level. From pad 28 the signals are fed through a series of jacks 31, 32, which permit the connection of the receiver to a different receiver control panel in case of trouble, or vice versa. A bridging jack 33 is also provided for monitoring purposes. On the office side of jacks 31–33, inclusive, the signals are fed through a transformer T–1, consisting of a primary winding 34 and two separate secondary windings 35, 36. The center tap of the primary 34 is connected over conductor 37 to a negatively grounded voltage source 38 through the winding of a CR relay. Also, at the land-based receiver R–1, the center tap of the transformer 27 secondary is connected to the armature C–1 of the carrier relay C, the front contact of which armature is grounded as shown. Thus, whenever receiver R–1 receives carrier from a mobile subscriber's station, the C relay will operate to ground the center tap of the transformer 27 secondary and thereby ground the center tap of the T–1 transformer primary 34, to actuate the CR relay, which in turn energizes, from battery 38 and through the front contact and grounded CR–2 armature of the CR relay, green carrier lamps 34*a*, 34*b*, mounted on control and switchboard receiver panels 71, 72 at the control terminal and at the switchboard operator's positions respectively.

The secondary winding 35 of transformer T–1 is connected through the front contact and B–1 armature of a normally deenergized B relay across the fixed arm of a manually adjustable volume control 39, constituting the input to a mixer circuit 40. As can be seen from the drawing, the B relay is actuated from battery 38 to ground at 38*a* through the front contact and CR–1 armature of the CR relay and thence in series through the A–1 armature and back contact of the A relay. Thus, the B relay is actuated whenever the CR relay is, provided the relay A is deenergized. As explained hereafter, the purpose of the A relay is to disconnect the receiver circuit in case of trouble, so that when the circuit is functioning properly, this relay is deenergized and the CR and B relays energized as aforesaid, during reception of incoming carrier from a mobile subscriber's station.

As can be seen from Fig. 7 illustrating the mixer circuit when such carrier is incoming, the aforesaid transformer secondary 35 is connected via the volume control 39, between the control grid 41 and the cathode 42 of a mixer pentode tube 43. The space path of this tube is energized from negatively grounded battery 44 through resistor 45, the anode to cathode space path 46, 42, through the grid biasing resistor 47, and thence through a common cathode impedance 48, which is common to all receiver circuits, to ground at 49. The lower terminal of the fixed arm of the input volume control 39 is connected between resistors 47, 48, while the variable tap 50 is connected to the control grid 41. The suppressor grid 51 of the pentode is connected to the cathode, as shown, while the screen grid 52 is connected to the plate battery 44 through resistor 53 and also through the by-pass condenser 54 to ground at 49. Connections corresponding to 55, 56, from the mixer tubes in other land-based receiver circuits, are connected to the common cathode impedance, as at 57, 58. It will be observed that with this method of connection, the mixer tubes for all land-based receiver circuits, such as R–1, R–2, R–3, etc., work into a common cathode impedance 48, but the method of connection is such as to prevent coupling between their respective grid circuits.

The common cathode impedance 48 of the mixer tube is connected through a blocking condenser 59 across the primary winding of a transformer T–2, the secondary of which is connected through series resistors 60 to a pair of bus bars 61 mounted on the main transmitter of mixer panel, Fig. 3*a*, comprising the portion of the Fig. 3*a* drawing above A—A, to the left of B—B, and to the right of D—D. These bus bars are connected through a limiting amplifier 101 to the main transmitter input and a jack on the central office operator's switchboard, as explained hereinafter, but before discussing this portion of the circuit, the remaining equipment on the receiver panel will be described.

For observing whether the land-based receiver circuit R–1 is operating satisfactorily, the remaining secondary winding 36 of transformer T–1 is connected via a manually adjustable volume control 62 to the input of a neon driver circuit 63, across the output of which are bridged neon tubes, as at 64, 65, on the control terminal and switchboard panels 71, 72 respectively. As shown in Fig. 6, the neon driver circuit comprises a single stage, audio-frequency amplifier, including a pentode tube 66, across the input to which, i. e., grid-cathode, the variable arm of the volume control 62 is connected, while the output circuit, i. e., plate-cathode, comprises a resistance 67 in series with a blocking condenser 68, across the resistance portion of which the neon tubes, such as 64, are bridged. Resistance 69 is a grid-biasing resistance traversed by plate current supplied from +B through resistor 70.

The above constitutes the simplest form of speech supervision wherein a neon tube is connected across the output of a speech amplifier, and the input of which is connected to circuit 14 extending from the land-based receiver R–1 in the manner above explained. To insure positive visual indication both on the control panel 71 and on the switchboard panel 72 during a marginal output from the neon driver 63, the two neon lamps 64 and 65 may be placed in series. This will preclude the illumination of only one neon lamp when connected in parallel combination if there is a difference in operating characteristics between the two neon lamps. It is understood that the circuits extending from the other land-based receivers R–2, R–3, etc., will be similarly equipped. If noise is received over any such circuit, the associated neon tubes will glow continuously, but as speech is received in the absence of noise, the fluctuations in speech will produce flickering of the tubes which can easily be recognized. Such neon lamps can be small enough for mounting in lamp strips, as at 64, on the control terminal receiver panel 71, and at 65 on the central office operator's switcboard 72, whereby the operation of the receiver circuit can be observed at both locations.

The operator will disconnect a receiver whenever it transmits noise only, rather than speech, or whenever a receiver is otherwise defective. As was pointed out above, the A relay will determine whether the receiver circuit is connected to the mixer circuit 40 or not, and this irrespective of whether or not the CR relay is actuated. This is because the A relay controls the B relay, which in turn connects the T–1 transformer secondary winding 35 to the mixer.

Relay A has two windings 73 and 74. Winding 73 is energized from battery 38 to ground at 75 through toggle switches 76, 77 mounted on the control terminal and operators' switchboard panels 71, 72, respectively. It can be seen that operation of switch 76 at the terminal will take control away from the switchboard position. These switches are to be used when a receiver is to be cut out for longer periods, for instance, because of defective filter condensers in the power supply, etc. When the A relay is operated, it will energize red lamps 79, 80 on panels 71, 72, from battery at 38 to ground at 75 through the A–3 armature and front contact of the A relay.

For purposes of rejecting a receiver circuit for short periods only, as for example for the duration of a call, or portion thereof, as where a noisy receiver is encountered, push-button switches 81, 82 are provided on the control terminal and operator's panels 71, 72 respectively. Depression of either of these switches will actuate the A relay through its winding 74 over a circuit traced from battery 38 through resistance 83 and the relay winding 74, thence over connection 84 through the contacts of the depressed push-button 81 or 82, thence over a connection 85 through the XP–1 armature and grounded front contact of a transmitter power relay XP, provided this relay is energized. As will be explained hereinafter, the XP relay is energized during periods that the main transmitter T is switched on to transmit outgoing carrier. Accordingly, depression of one of the reject push-buttons 81, 82 will reject a receiver circuit only during periods that the main transmitter is energized. When the A relay operates over the circuit above traced, it will lock itself through its A–2 armature and front contact, and thence to ground over connection 85 and through the XP–1 armature and front contact of the XP relay. It will be understood that each of the other land-based receiver circuits, such as R–2, R–3, etc., is provided with A relay and reject switch 81, 82 circuits, similar to that above described for receiver R–1. For all such receivers, a connection similar to 85 extends to the XP–1 armature of the XP relay, as indicated by the connections 86 thereto, whereby any one of a number of such receivers may be similarly rejected upon actuation of the XP relay. Whenever a call is terminated, the main transmitter T is switched off, as explained below, resulting in release of the XP relay, whereby the holding circuits for all actuated A relays are opened at the XP–1 contacts of the XP relay, and all receivers that had been rejected during this call are thus restored to normal. This circuit arrangement is employed in order to eliminate the operator's failure, due to forgetfulness, to restore a receiver which was temporarily rejected for noise, etc. If, during a conversation, the operator notes from the neon tubes 64, 65 that the thus rejected, temporarily noisy receiver is operating satisfactorily again and wants to reconnect this receiver, this may be accomplished by actuating reset push-button switches 87, 88 provided on panels 71, 72 respectively. It will be observed that actuation of either of these push-button switches short-circuits, over connections 84, 89, the energized winding 74 of the A relay, thereby causing this relay to release. It will be further noted, in this connection, that the neon lamps 64, 65 are energized at all times during a call, irrespective of whether or not the receiver circuit has been rejected, so that the operator can supervise signals from this receiver even though disconnected from the mixer circuit, and thus ascertain by inspection when a receiver, temporarily rejected for noise, is operating satisfactorily again in the reception of speech signals.

The central office or switchboard equipment is shown to the right of C—C, Figs. 3*a* and 3*b*. It may be located in the same building with the control terminal, or in a different building some distance away. In any event, a ten-conductor connection is required between the control terminal receiver panel 71 and the operator's switchboard panel 72, as shown by the X's along B—B in Fig. 3*b*. This ten-conductor connection can be made of the plug-in type, employing a ten-pin connector at the control terminal panel 71. This facilitates rearranging location of receiver positions on the central office switchboard. Also, on the receiver panels 71, 72, the lamps and switches 64, 34*a*, 79, 76, 87, 81 and 65, 34*b*, 80, 77, 88, 82, required for each land-based receiver, can be mounted, as illustrated in Fig. 9, on one lamp strip 90 and one push-button strip 91. Also, since each receiver requires but three lamps and three switches, the lamps and switches for a total of three receivers can be mounted in the aforesaid lamp and push-button strips 90, 91, as indicated at 92, 93, 94 respectively.

Whenever a call incoming on receiver R–1 from a mobile station energizes the C, CR and B relays as aforesaid, a circuit is completed to energize a call lamp relay CL, which in turn energizes white call lamps 95, 96 mounted on the control terminal mixer and switchboard panels 96*a*, 97 respectively, provided that when such call is incoming, the receiver is not disconnected by actuation of the toggle switches 76, 77. The operating circuit for the CL relay is traced from negatively grounded battery 97*a* through the CL relay winding, through contacts of a toggle switch 98*b*, the purpose of which will be explained below, thence through an XP–3 armature and back contact of the XP relay, thence over connection 98 through a front contact and B–2 armature of the B relay to ground through the back contact and grounded A–4 armature of the A relay. Since this circuit is traced through back contacts of the transmitter relay XP and also through back contacts of the receiver reject relay A, it will be evident that the call relay CL will not be energized on an incoming call if either the receiver circuit has been disconnected as aforesaid, or the transmitter T is already energized and engaged on another call. The other land based receivers R–2, R–3, etc., have similar connections above traced to the back contacts of the XP–3 armature, as indicated at 98*a*, and for similar purposes as above described. Operation of the CL relay over the circuit traced in turn energizes the white call lamps 95, 96 from battery 99 to ground through the CL–1 armature and grounded front contact of the CL relay.

As was explained above, the various land-based receiver circuits R–1, R–2, R–3, etc., are connected through their mixer tubes 40 in multiple to the common cathode impedance 48, and thence through transformer T–2 and series resistors 60 to the bus bars 61. The main transmitter T is also connected from these same bus bars through series resistors 100, and thence through a gain-limiting amplifier 101, the output of which latter is coupled through a transformer T–5 and thence through series jacks 102, 103, and an impedance-matching, attenuating pad 104, to a circuit 104*e* extending to the main transmitter location (at the left of E—E) and through an input-transformer T–6 thereat to the input of the main transmitter T. As shown in Fig. 4, the pad 104 comprises an impedance-matching transformer 104*a*, and an attenuator 140*b*, at the midpoints of which condensers 104*c*, 104*d* are interposed. Bridging jacks 106*a* and 106 are provided on the mixer panel for monitoring on the bus bars 61 and transmitter input circuits respectively. The bus bars 61 are also connected through series resistors 107, and thence through a transformer T–3 and contacts of a gang switch 108, to a jack 109 on the operator's switchboard panel. A voice-time relay 110 is connected through series resistors 111 and over a circuit 112*a* to the T–5 transformer primary winding. Also, the output of a dialing tone oscillator 112 is connected to circuit 112*a* through a transformer T–4 and series resistors 113.

This mode of coupling the outputs of the land-based receivers and the input to the main transmitter through common bus bars 61 to the switchboard jack 109, connects the transmitter input directly across the bus bars 61, via the amplifier 101, instead of being connected to the central office jack 109 through an hybrid coil, which latter would uncouple the transmitter with respect to signals incoming over the land-based receiver circuits. This is done in order to provide conversation between the mobile subscribers' stations. In such a conversation, a mobile station MS–1 may be talking, having depressed his "push-to-talk" button. His signals are picked up on a land-based receiver, such as R–1, and fed thence to the bus bars 61, from whence they are re-broadcast by the main transmitter T. This enables any other mobile station having equipment similar to MS–1 to receive the signals from station MS–1, even though the radio transmitter of station MS–1 is tuned to a different frequency from that of the radio receiver of the other mobile station. The reverse will occur when the other mobile station transmits through the control terminal to station MS–1.

Jack 109 which is mounted on the operator's switchboard provides tip, sleeve and ring connections to the operator's cord plug. The sleeve connection is employed to control the dialing operation. The tip and ring connections are used for the transmission of speech, as well as for control of the main transmitter T and the dial-tone generator 112. It will be observed that the tip and ring connections of jack 109 are wired through the upper contacts of the gang switch 108, to the opposite terminals of the primary winding of transformer T–3; while the sleeve connection is similarly wired through the gang switch to a front contact of the TR–3 armature of a TR relay. The purpose of the gang switch is to transfer control of the circuit from the central office operator's jack 109 on the switchboard to the technical operator's jack 121 at the control terminal, for which purpose the tip, sleeve and ring connections of jack 121 are wired to the lower terminals of gang switch 108, in the same manner that the corresponding conductors of jack 109 are wired to the upper terminals thereof. Thus, actuation of the gang switch transfers the above-traced circuits from jack 109 to jack 121 or vice versa. The technical operator's position is provided with a cord circuit 122 and associated telephone set similar to 123, provided at the central office operator's switchboard. The technical operator can thus take over in case of trouble.

When the operator inserts her cord plug 120 in jack 109 to answer a call, the transmitter control relay XP is energized over a circuit traced from negatively grounded battery 130 through the relay winding and thence through the upper half of the T–3 transformer primary winding to the tip conductor of the cord, and thence to ground at 131 in the operator's cord circuit. This actuates the XP–2 armature of the XP relay against its associated front contact, and thereby completes a circuit to energize the TX relay at the transmitter, this circuit being traced from the negatively grounded battery 99, through resistor 99*a* and toggle switches 146, 145 in series, thence over connection 132 through the XP–2 armature and front contact of the XP relay, thence through the lower half of the T–5 transformer secondary winding, and through the jacks 102, 103, through the pad 104, the lower half of the T–6 transformer primary winding and through the TX relay to ground. The resulting operation of the TX relay closes, through its TX–1 armature and front contact, a circuit for switching on the outgoing carrier from transmitter T; and also closes, through its TX–2 armature and front contact, an energizing circuit for the slow release TP relay, the operation of which latter closes, through its TP–1 armatures and front contacts, a circuit from an alternating current power supply 133 for energizing transmitter T. The power supply 133 is coupled through a transformer T–7, to a rectifier circuit 134 containing the winding of the TP relay, whereby this relay operates from the power source 133 when the TX–2 armature of the TX relay is operated against its front contact. It will be noted in this connection that condensers are interposed at the midpoints of the primary windings on the T–3 and T–6 transformers, and at the midpoint of the secondary winding on the T–5 transformer, to isolate the upper and lower portions of these windings for direct current signaling purposes.

The XP relay upon operating also actuates its XP–1 armature against its grounded front contact, and thereby prepares the operating circuits above described for all the A relays. Therefore, as soon as the XP relay operates, the operator may reject any noisy or defective receiver circuits by depressing the associated reject push-buttons, such as 82.

It will be recalled that on a call incoming from a mobile station, the B relay operated to operate the CL relay over the circuit traced through the XP–3 armature and back contact of the XP relay, thereby to light the white call lamp 96 at the operator's position. When, therefore, the operator answers the call by inserting her plug 120 in jack 109, thereby to energize the XP relay to switch on the main transmitter T as above described, its XP–3 armature will be actuated against its front contact to deenergize the CL relay and thereby extinguish the call lamp 96, and thus advise the operator that the transmitter is switched on.

An alternative and preferred way of controlling the CL relay to assure that it will operate and thus light the calling lamp 96 when the transmitter carrier goes off the air or is not operating on its correct frequency, is to place the operating circuit for the CL relay under control of the monitor receiver carrier relay MC. As explained in connection with Fig. 1, the monitor receiver 24, which is located at the control terminal, picks up outgoing carrier from the transmitter T. Only when this carrier is outgoing approximately on its proper frequency is the MC relay operated. Now, the CL relay may be placed under control of the MC relay by operating switch 98*b* from its lower to its upper contact, whereby the operating circuit for the CL relay is traced through the MC–1 armature and back contact of the MC relay. Thus, when the operator answers a call incoming from a mobile station by inserting her cord plug 120 in jack 109, the white call lamp 96 will not be extinguished until the transmitter is outgoing on approximately the correct frequency, whereupon the MC relay will operate to release the CL relay and extinguish the lamp. Also if at any time during a call the transmitter carrier goes off frequency or ceases, the white lamp 96 will relight to so advise the operator.

On an outgoing call, the operator inserts her cord plug 120 in jack 109 and proceeds to dial the number of the mobile station desired. In order to do this, she must first actuate the dialing switch 135 of her cord circuit to the left, as shown in the drawing. This connects ground 131 to the ring contact of the cord plug and thus operates the tone relay TR from battery 130 to ground at 131, over the ring connection of jack and plug 109, 120. Operation of the TR relay connects the two-tone dialing generator 112 through the front contacts and TR–1, TR–2 armatures of the TR relay, to the upper and lower contacts respectively of the DR–1 armature of the dialing relay DR, and thence through transformer T–4 to the transmitter T input via transformer T–5. Operation of the TR relay also connects the dialing relay DR from negatively grounded battery 136 through the TR–3 armature and front contact of the TR relay, thence over the sleeve connections of jack and plug 109, 120 to the operator's dial 137 and thence to ground at 138. The operator may now proceed to dial. The DR relay will respond to and follow the dialing pulses over the sleeve circuit above traced, thereby to actuate its DR–1 armature between its lower or spacing contact and its upper or marking contact, to which the dial-tone generators 140, 139 of the two-tone generator are respectively connected as shown. Marking and spacing dial tones corresponding to the dialing pulses are thus applied to the input of transmitter T via transformer T–5 as aforesaid, thereby correspondingly to modulate the carrier outgoing from the transmitter.

When the called mobile station answers and switches on its transmitter carrier, the latter will be picked up by one of the land-based receivers, such as R–1, to actuate the C, CR and B relays thereof. This will operate the green switchboard lamp 34*b* to advise the operator of this fact.

A frequency monitor 150 is provided at the transmitter station T, the function of which is to indicate whether or not the carrier of the transmitter is outgoing on its correct frequency during a call. If it is not, a flashing signal will be given on the red disconnect lamps 143, 144 on the control terminal and switchboard panels 96*a*, 97 respectively. Thus, if, during a call, the transmitter T should get off its proper frequency, the frequency monitor relay FM which is energized by the transmitter carrier when outgoing on its correct frequency, will release. This will complete a circuit to energize relay FMR at the control terminal, traced from the negatively grounded battery 141 thereat through the FMR relay winding and through the upper half of the T–5 transformer secondary, through jacks 102, 103 and pad 104, the upper half of the T–6 transformer primary winding to ground through the back contact and grounded FM–1 armature of the FM relay. Operation of the FMR relay will connect a rotary intermittent ground at 142, driven by motor 142*a*, through the front contact and XP–4 armature of the now energized XP relay, and thence through the front contact and FMR–1 armature of the now energized FMR relay to red lamps 143, 144 on the control terminal and switchboard panels 96*a*, 97, whereby these red lamps will flash intermittently, being thus intermittently energized from the negatively grounded battery 99. This will warn the operator that the transmitter is off frequency and should be disconnected. The transmitter may be disconnected by actuating either of the series-connected toggle switches 145, 146 on panels 96*a*, 97, thereby to open the energizing circuit above traced for the TX relay. This prevents the transmitter power and carrier from being switched on by operation of the XP relay upon insertion of the operator's plug 120 in jack 109.

The mobile radio telephone system preferably employs frequency modulation. Due to the limiting features which are inherent in a frequency modulation system, the speech level incoming from the land-based receivers R–1, R–2, R–3, etc., will be practically independent of the distances of the mobile stations therefrom. The same cannot be said of the speech level incoming to the control terminal from land-based subscribers' stations, such as 21, Fig. 1. Some of these calls will come in at high volume, while others arrive through appreciable line attenuation. The function of the limiting amplifier 101 in the main transmitter input is to deliver speech at substantially constant volume level to the radio transmitter input, irrespective of the volume level incoming to the limiting amplifier 101. This amplifier is of conventional construction and hence requires no detailed description. It will be noted that the dial-tone generator 112 and the voice-time relay 110 are connected over circuit 112*a* to the output side of the limiting amplifier 101 in order to prevent distortion in the dial-tone generator pulses and also to deliver a substantially constant speech level to the voice-time relay.

The voice-time relay 110 connected to the transmitter input via transformer T–5, will monitor a telephone conversation and will give a steady disconnect signal on the red lamps 143, 144 if no speech is transmitted over a preselected period, for example, five to twenty seconds, depending on the setting of the device. Referring to Figs. 3*a* and 8, this circuit is connected to the primary of transformer T–5 through series resistors 111 and the voice-time relay input transformer T–8, the secondary of which is connected through a volume control 150*a* to the grid-cathode circuit of a triode amplifier tube 151, which also can either be a pentode or a tetrode, the anode circuit of which is energized from negatively grounded battery 152 through the anode resistor 154 and the grid-biasing resistor 153 to ground at 155. The amplified speech ouput of tube 151 traverses the circuit comprising blocking condenser 156 and resistance 157, the latter being included in the grid-cathode circuit of a gas-filled triode 158. The current from battery 152 traversing the cathode resistor 159, and bias controlling resistor 160, applies sufficient negative bias to the grid of this tube to prevent firing when no speech is incoming. The space path of this tube, when fired, is energized from source 152 through resistors 159 and 161. The output circuit comprises a condenser 162 in series with a resistance 163. Connected in shunt to condenser 162 through the XP–5 armature and back contact of the transmitter relay XP, is a relatively low resistance 164. Thus, when the transmitter relay is energized, this shunt resistance will be disconnected. Condenser 162 is connected in the grid-cathode circuit of the triode tube 165, the grid of which is negatively biased to about 105 volts by current flow from battery 152 through resistors 166, 167, the former being shunted by a gas-filled, voltage-regulating diode 168. The plate current of tube 165 traverses the winding of a voice-time relay VT having an armature VT-1 and grounded front contact connected in the energizing circuit for the red disconnect lamps 143, 144, through the back contact and FMR–1 armature of the FRM relay, as shown in Fig. 3*a*.

The operation of this circuit is as follows: When a telephone connection is established, the XP relay will operate to remove, through its XP–5 armature contacts, the shunt resistance 164 from condenser 162. Also, during conversation on the connection, the gas-filled tube 158 will be fired constantly by the incoming speech, and thus keep the condenser 162 discharged to a low average voltage. During periods that no speech is incoming, however, the gas-filled tube 158 will not fire, and condenser 162 will accordingly charge up through resistances 161, 163 from battery 152. As soon as the voltage on condenser 162 exceeds the biasing voltage on the grid of the third tube 165 (approximately 105 volts derived from the VR105 tube 168), the third tube will begin to conduct and the voice-time relay VT will be energized. Referring now to Fig. 3*a*, it will be noted that upon energization of the VT relay, a circuit is completed to actuate the red warning lamps 143, 144 from battery 99, through the FMR–1 armature and back contact of the frequency monitor relay FMR, and thence through the VT–1 armature and grounded front contact of the VT relay.

Reverting to Fig. 8, the time constant for the condenser charging circuit 161, 162, 163 is adjustable by means of the variable elements 161, 162 and can be thus adjusted so that the VT relay will be operated after a lapse of time of anywhere from about five to twenty seconds, during which no speech is incoming. Upon conclusion of the call, when the operator disconnects her cord plug 120 from jack 109, the transmitter relay XP will release, thereby reconnecting the low resistance 164 in shunt to condenser 162. This will discharge the condenser through the low resistance 164 and keep it discharged. The third tube 165 will accordingly cut off so that the VT relay can not operate. The firing level of tube 158 can be varied by adjustment of resistance 160.

*Incoming calls*

To briefly review the operation of the control terminal circuits on calls incoming from a mobile station, the carrier relay C will operate on the nearest land-based receiver station, which in turn will operate the CR relay to light the green lamps 34*a*, and 34*b*, which remain operated so long as the carrier is incoming from the mobile station. The B relay will thereupon operate if the receiver circuit has not been previously rejected by the operator by operation of one of the on-off switches 76, 77, which actuate the A relay. The B relay, upon operating, actuates the call lamp relay CL, which in turn energizes the white call lamps 95, 96. The operator upon observing the incoming call, inserts her cord plug 120 in jack 109, thereby to energize the transmitter relay XP, which in turn, through its XP–2 armature and front contact, energizes the TX relay, the latter in turn energizing the TP relay, thereby to switch power on to the main transmitter T and also to switch on the outgoing carrier. Operation of the XP relay also deenergizes, through its XP–3 armature contacts, the CL relay if switch 98*b* is on its lower contact. The CL relay in thus releasing, extinguishes at its CL–1 contacts the white call lamps 95, 96. Also operation of the XP relay completes a circuit through its XP–1 armature and contacts to permit the operator to reject the receiver circuit if noisy by operation of one of the reject push-buttons 81, 82. If switch 98*b* is on its upper contact, the CL relay will not be released to extinguish the white call lamps 95, 96 until the carrier is outgoing from the main transmitter on approximately the correct frequency, whereupon the monitor receiver relay MC will operate to deenergize through its MC–1 armature contacts the CL relay. So long as the carrier is thus outgoing from the main transmitter on the correct frequency, the frequency monitor relay FMR will be released, owing to energization of the frequency monitor relay FM and the consequent operation of its FM–1 armature against its front contact. If, however, the carrier gets off frequency, the FM relay will release to actuate the FMR relay, thereby to apply the intermittent ground 142 to the red warning lamps 143, 144 through the FMR–1 contacts of the FMR relay and also the XP–4 contacts of the now energized XP relay. If, during the conversation, a lull of more than five to twenty seconds occurs, depending on the setting of the voice-time relay 110, the latter will operate to place a steady signal on the red warning lamps 143, 144, whereby the operator challenges on the circuit. At the conclusion of the call, the mobile station will switch off its outgoing carrier, thereby to release the C and CR relays and thus extinguish the green lamps 34*a*, 34*b*, and also the B relay will release at the CR–1 contacts of the CR relay. When the operator disconnects her plug 120 from jack 109, the XP relay will release to release the TX relay, which, after a time, will release the slow-release relay TP to switch off carrier and disconnect power from the main transformer T.

*Outgoing calls*

On outgoing calls, the operator will insert her cord plug 120 in jack 109 and thus actuate the XP, TX and TP relays for purposes aforesaid. The red warning lamps 143, 144 will light up until the carrier is outgoing on the correct frequency to actuate the FM relay and thus release the FMR relay. The operator thereupon actuates her dialing switch 135 to the grounded contact 131, which actuates the TR relay, the latter in turn connecting, through its TR–1, TR–2 armature contacts, the dialing tones 139, 140, to the marking and spacing contacts of the DR–1 armature of the dialing relay DR. Operation of the TR relay also connects, through its TR–1 armature contacts, the dialing relay to the operator's dial 137. The operator thereupon dials the desired number to actuate the DR relay in accordance therewith and thus transmit the corresponding marking and spacing dialing tones to the main transmitter for modulation of the outgoing carrier therewith. When the called mobile station answers by switching on its outgoing carrier, the land-based receiver relays C and CR will operate to energize the green lamps 34a, 34b, thus to advise the operator that the called station has answered. After dialing, the operator restores the switch 135 to the position shown in the drawing, thus to release the TR relay and with it the DR relay. At the conclusion of the call, the carrier from the mobile station is switched off to release the C and CR relays and extinguish the green lamps 34a, 34b. The operator also disconnects her cord plug to release the XP, TX and TP relays, and thence also the MC relay, thereby all circuits are restored to normal.

What is claimed is:

1. In a radio communication system: a radio transmitter and receiver, first relay means responsive to carrier current incoming to said receiver, a first signaling device actuated by said first relay means, second relay means actuated responsive to actuation of said first relay means, a second signaling device actuated by said second means, third relay means for energizing said transmitter, switching means for actuating said third relay means, and means responsive to actuation of said third relay means for extinguishing said second signaling device, said actuation of said second relay means establishing a path to said transmitter for signals received by said receiver, said signals re-broadcast by said transmitter upon said energization of said transmitter.

2. In a radio telephone system: a radio telephone transmitter and receiver, a control terminal, first relay means responsive to carrier current incoming to said receiver; a first signaling device actuated by said first relay means, second relay means responsive to actuation of said first relay means, a second signaling device actuated by said second relay means, third relay means for energizing said transmitter, switching means for actuating said third relay means, means responsive to actuation of said third relay means for extinguishing said second signaling device, speech and noise signal amplifying means coupled to the output of said receiver, means at said control terminal connected to said amplifying means for visually indicating the variations in amplitude of said speech and noise signals, said indicating means comprising means for producing a flow of current varying in accordance with the variations in amplitude of said signals and means for visually indicating the variations in said flow of current, and means operated responsive to the actuation of said second relay means to connect the output of said receiver to said transmitter to enable said transmitter to rebroadcast said speech signals received by said receiver.

3. In a radio telephone system: a radio telephone transmitter and receiver, a control terminal, first relay means responsive to carrier current incoming to said receiver, a first signaling device actuated by said first relay means, second relay means responsive to actuation of said first relay means, a second signaling device actuated by said second relay means, third relay means for energizing said transmitter, switching means for actuating said third relay means, means responsive to actuation of said third relay means for extinguishing said second signaling device, speech and noise signal amplifying means coupled to the output of said receiver, means at said control terminal connected to said amplifying means for visually indicating the variations in amplitude of said speech and noise signals, said indicating means comprising glow discharge tube means connected to said amplifying means and responsive to the amplified signal voltages at the output to said amplifying means, and means operated responsive to the actuation of said second relay means to connect the output of said receiver to said transmitter to provide a path to said transmitter for said speech signals received by said receiver.

4. In a radio communication system: a radio transmitter and receiver; means connecting said receiver output and said transmitter input to a switchboard jack; a first relay means responsive to carrier current incoming to said receiver for actuating a first signaling device at said switchboard; a second relay means responsive to actuation of said first relay means for actuating a second signaling device at said switchboard; a third relay means responsive to insertion of an operator's cord plug in said jack for switching on carrier current outgoing from said transmitter; a monitor receiver selectively receptive of said outgoing carrier; a fourth relay means connected to said monitor receiver and responding to said transmitter carrier when outgoing on approximately a preselected frequency; and means responsive to actuation of said fourth relay means for extinguishing said second signaling device.

5. In a radio communication system: a radio receiver; a first relay means responsive to carrier current incoming to said receiver for actuating a first signaling device; a switchboard jack; a second relay means responsive to energization of said first relay means for connecting said receiver output to said switchboard jack and for energizing a second signaling device; a third relay means responsive to insertion of a cord plug in said jack for deenergizing said second signaling device; and a fourth relay means energizable by a manual switch for preventing energization of said second relay means.

6. In a radio telephone system: a radio receiver; a speech amplifier coupled to said receiver output, a visual indicator connected to said amplifier for differentiating between noise and speech-modualted carrier current incoming to said receiver; a first relay means responsive to said incoming carrier current for energizing a first signaling device; a switchboard jack; a second relay means responsive to energization of said first relay means for connecting said receiver output to said switchboard jack and for energizing a second signaling device; a third relay means having a plurality of contacts, said relay means responsive to insertion of a cord plug in said jack for extinguishing said second signaling device; a fourth relay means energizable by actuation of a first switch through one of said plurality of contacts of said third relay means for disconnecting said receiver output from said jack; and means including a second switch for thereafter deenergizing said fourth relay means to reconnect said receiver output to said switchboard jack.

7. In a radio telephone system: a radio telephone transmitter and receiver; a pair of bus bars and a switchboard jack; means connecting said bus bars to the output of said receiver output and said jack and said transmitter input respectively; a first relay means responsive to carrier current incoming to said receiver for connecting the receiver output to said bus bars; a second relay connected to said bus bars and associated with a timing circuit, and a signaling device, said timing circuit effective in response to the reception of unmodulated carrier current for a preselected period to operate said relay associated therewith, said relay effective to control the operation of said signaling device to indicate when no carrier modulating currents have been transmitted through said bus bars over said preselected period.

8. In a radio telephone system: a radio telephone transmitter and receiver; a pair of bus bars and a switchboard jack; means connecting said bus bars to said receiver output and said jack and transmitter input respectively; a first relay means responsive to carrier current incoming to said receiver for connecting the receiver voice output to said bus bars; a second relay means responsive to insertion of an operator's cord plug in said switchboard jack for switching on carrier current outgoing from said transmitter whereby said incoming voice currents are re-broadcast by said transmitter; a third relay connected to said bus bars and associated with a timing circuit, and a signaling device, said timing circuit effective in response to the reception of unmodulated carrier current for a preselected period to operate said relay associated therewith, said relay effective to control the operation of said signaling device to indicate when no carrier modulating currents have been transmitted through said bus bars over said preselected period.

9. In a radio telephone system: a radio telephone transmitter and receiver; a switchboard jack and means connecting the same to said transmitter input; a first relay means responsive to carrier current incoming to said receiver for connecting said receiver output to said jack and to said transmitter input; a second relay means responsive to insertion of a cord plug in said jack for energizing said transmitter to transmit outgoing carrier; a frequency monitor having connected thereto a frequency monitor relay responsive to said outgoing carrier when of a preselected frequency; a voice time relay connected to said transmitter input for indicating when no speech has passed for a preselected interval; and signaling means responsive to release of said frequency monitor relay for providing a first signal when said outgoing carrier is off frequency; said signaling means responding to energization of said voice time relay to provide a second and different signal when no speech has been transmitted over a preselected period.

10. In a radio telephone system: a radio telephone transmitter and a multiplicity of radio telephone receivers; a first relay means responsive to carrier current incoming on any said receiver for energizing a first signaling device; a second relay means responsive to energization of said first relay means for electronically coupling the output of said receiver to an output impedance common to all said receiver output circuits; means coupling said output impedance to the input of said transmitter and to a switchboard jack; means responsive to energization of said second relay means for energizing a second signaling device at said jack; a third relay means responsive to insertion of a cord plug in said jack for extinguishing said second signaling device and for switching on said transmitter to transmit outgoing carrier; means including a frequency monitor having connected thereto a carrier relay energizable by said outgoing carrier when of a preselected frequency; and a third signaling device responsive to deenergization of said carrier relay for indicating with an interrupted signal when said outgoing carrier is off frequency.

11. In a radio telephone system: a radio telephone transmitter and a multiplicity of radio telephone receivers; a first relay means responsive to carrier current incoming on any said receiver for energizing a first signaling device; a second relay means responsive to energization of said first relay means for electronically coupling the output of said receiver to an output impedance common to all said receiver output circuits; a manually operated device, means operated in response to actuation of said device for switching temporarily from said receiver to any other receiver whenever trivial malfunctioning occurs, a second manually operated device, means operated responsive to actuation of said second device for switching permanently from said receiver to any other receiver whenever a serious malfunctioning occurs; means responsive to energization of said second relay means for energizing a second signaling device at said switchboard jack; a third relay means responsive to insertion of a cord plug in said switchboard jack for deenergizing said second signaling means and for energizing said transmitter to transmit outgoing carrier; means coupling said output impedance to the input of said transmitter and to a swichboard jack, whereby signals incoming to said receiver are transmitted to said switchboard jack and are also re-broadcast from said transmitter; a fourth relay coupled to said output impedance and associated with a timing circuit, and signaling means coupled to said fourth relay, said timing circuit effective in response to the reception of unmodulated carrier current for a preselected period to operate said relay associated therewith, said relay effective to control the operation of said signaling means to indicate when no carrier modulating currents are transmitted over said preselected period.

References Cited in the file of this patent

UNITED STATES PATENTS

| | | |
|---|---|---|
| 1,472,987 | Murphy | Nov. 6, 1923 |
| 1,592,613 | Meyer | July 13, 1926 |
| 2,064,958 | Taylor | Dec. 22, 1936 |
| 2,171,348 | Schneider | Aug. 29, 1939 |
| 2,183,389 | Bjornson | Dec. 12, 1939 |
| 2,190,546 | Laube | Feb. 13, 1940 |
| 2,265,056 | Bowers | Dec. 2, 1941 |
| 2,383,908 | Bowers | Aug. 28, 1945 |
| 2,475,675 | Peterson | July 12, 1949 |
| 2,575,358 | Nuckolls | Nov. 20, 1951 |